Jan. 19, 1943.   C. E. McMANUS   2,308,530
CONTAINER
Filed Oct. 29, 1942
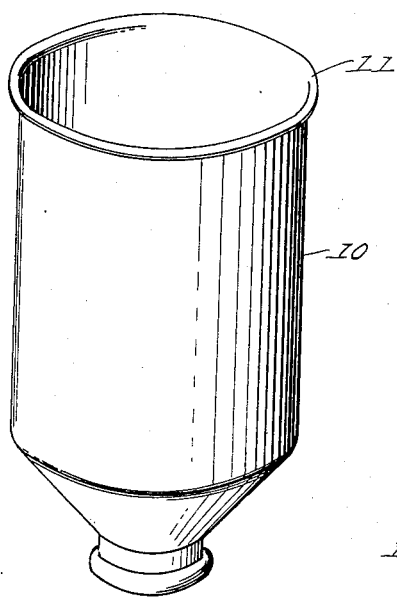
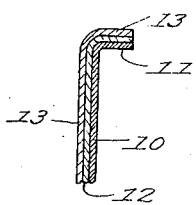
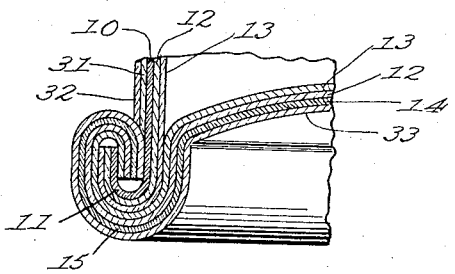
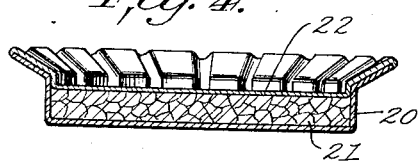
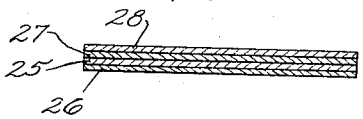
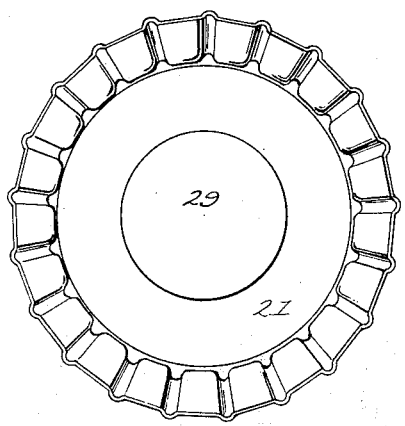
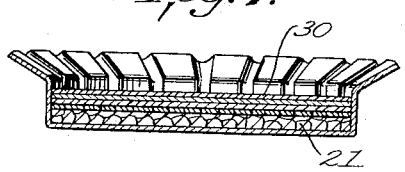
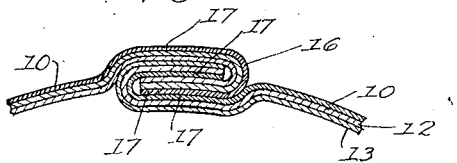
Inventor
Charles E. McManus.
By Cushman Darby & Cushman
Attorneys Patented Jan. 19, 1943

2,308,530

UNITED STATES PATENT OFFICE 2,308,530

CONTAINER

Charles E. McManus, Spring Lake, N. J., assignor to Crown Cork & Seal Company, Inc., Baltimore, Md., a corporation of New York Application October 29, 1942, Serial No. 463,857

13 Claims. (Cl. 220—64)

This invention relates to containers and closures therefor, as well as materials for association with such closures, e. g., spot or overall facings.

The invention includes a novel container such as one of the metal can type having its interior wall provided with a film containing polyvinyl acetal resin. This resin film is tough, strongly adherent to metal, is acid and alkali resistant, is particularly resistant to water and moisture vapor, and can be prepared to be resistant to many common solvents. Such a container is useful for chemicals, pharmaceuticals, oils, and numerous other products, but is markedly satisfactory in connection with food products and beverages, including carbonated beverages, such as beer, toward which it is physically and chemically inert. Moreover, a can liner film of polyvinyl acetal resin is both tasteless and odorless.

The various properties above set forth make the coating equally useful as an exterior or outside film for containers, and, in such cases, the film can be suitably pigmented if desired or may be clear and applied over a suitable base coating, such as one containing aluminum, to give an attractive appearance.

The properties above described make the polyvinyl acetal resin coating particularly useful in connection with the interior and exterior coating of caps and other closures, namely, crown caps, screw caps, lug caps, and pressed on caps. In this connection, the film strength and adherence of the coatings is so pronounced that a flat sheet of metal coated on one or both sides with a composition of polyvinyl acetal resin alone or in combination with other suitable resins, may be punched, stamped, or otherwise acted upon to produce closures having a strongly adherent continuous protective film.

The polyvinyl acetal resin film is also useful for lining the interior of closures having a cushion liner, in that it is adherent to such cushion liner material as composition cork, as well as cellulose products, such as paper, paper-like bodies, cellulose esters and Cellophane, and likewise is adherent to metal. Thus, a continuous film may be provided as by spraying on the interior of the cap which will cover the raw edge, the exposed area of the skirt, and the exposed area of the cushion liner. In lieu of such construction, paper or metal foil may be coated with a film of the polyvinyl acetal resin and punched out to form either center spots or overall facings for the closure which are adhesively bonded to, or, in some cases, loosely associated with the cushion liner or cap.

In connection with the use of the polyvinyl acetal resin coating for packaging purposes, a notable property is its ability to withstand pasteurizing and sterilizing temperatures as distinguished from usual thermoplastic materials, i. e., the coatings of the present invention do not soften objectionably at temperatures up to substantially 125° C.

In addition to the value of the polyvinyl acetal resin as the principal or single film forming constituent of the coating, it exhibits remarkable properties when used in connection with other film forming materials, particularly chlorinated rubber and alkyd resins, in the latter case, increasing the alkali resistance of the same.

I have found that a small percentage of polyvinyl acetal resin in a coating solution of chlorinated rubber will substantially increase the toughness and flexibility of the resultant film and adds materially to its life and its field of application.

Conversely, I have found that the thickness of the film deposited from a solution of polyvinyl acetal resin can be increased without objectionably raising the viscosity of the solution by including therein an appropriate amount of a low viscosity grade of chlorinated rubber. Such a solution will deposit a thicker film than is obtainable with solutions of polyvinyl acetal resin alone having substantially the same viscosity. Moreover, polyvinyl acetal solutions which are prepared for spraying, may, if desired, be rendered useful for roller coating in this manner.

The polyvinyl acetal resin also forms a highly resistant coating with long oil alkyd resins. Such compositions while they may be used for lining and spotting purposes are also suitable for outside coatings, in that they may be suitably pigmented to impart a desired attractive color. In this connection, spotting paper may be prepared by coating the untreated paper with a composition including polyvinyl acetal resin and long oil alkyd resin, and then applying over this coating a thin film of the polyvinyl acetal resin, or a film of chlorinated rubber and polyvinyl acetal resin.

Coating compositions including polyvinyl acetal resin in accordance with this invention may be applied directly to the interior or exterior or both of a metal container or closure, as well as cellulosic products, or they may be applied upon a suitable base coating. In this connection, the coatings may be transparent or suitably colored, and in the case of transparent coatings impart a very attractive appearance when applied for instance over a lustrous metal surface, such as one prepared by the deposition of aluminum.

The coating may comprise compositions in which the polyvinyl resin is the sole or main film forming constituent, or, as stated, this resin may be combined with other resins to produce films of various characters. In each case, it is observed that either the strength, flexibility or resistance of the films are enhanced and products suitable for a wide range of use made available.

Container bodies and can ends having seaming flanges coated with compositions containing solely or mainly polyvinyl acetal resins or with compositions including the same and other ingredients, such as chlorinated rubber, are very adequately sealed when a bottom is seamed to a container body, since such coatings are sufficiently flexible and plastic to accomplish this result under the pressure incident to rolling the seam. This remarkable characteristic is observable in the case of containers having seamless bodies, i. e., containers which are drawn from a single blank of metal as set forth in application Serial No. 334,876. With such containers, when the interior is lined, the seaming flange is also coated with the lining and provides a satisfactory seal when the bottom is attached as by roll seaming. The coating, of course, will be of a suitable thickness, and not only is the flange coated, but the bottom also usually will, although it is not always necessary, have its sealing flange portion similarly coated, as well as its interior exposed bottom wall. It follows, of course, that instead of coating the flange of the body, the sealing flange of the bottom may be coated with a sealing film alone or mainly of polyvinyl acetal resin, or chlorinated rubber and polyvinyl acetal resin. This sealing characteristic is also useful in connection with lock seam side seam cans for sealing the side seams as well as the seams uniting the bottom and top or ends.

The polyvinyl acetal resins are soluble in a wide range of solvents, are compatible with other resins, and the coating solutions may be pigmented. The combination of these properties in one material has enabled the compounding and formulation of coatings valuable in the container and closure field, as will be later exemplified. It is important to point out that the properties of one polyvinyl acetal resin may differ somewhat from those of another. For example, the resin manufactured from formaldehyde (Formvar) is soluble in ethylene dichloride and insoluble in alcohol, while the resin made with butyraldehyde (Butvar) is only moderately soluble in ethylene dichloride, but completely soluble in alcohol. The properties of the particular and various polyvinyl acetal resins make the resin widely applicable to meet a range of conditions, such as are encountered in the packaging field.

For example, a suitable spray coating preferably for lining cans and which is applied either to the black iron or to a coated base, such as aluminum on black iron, is prepared as follows:

*Example 1*

| | Grams |
|---|---|
| Trichloroethylene | 350 |
| Formvar resin 15/95 | 30 |
| Diamyl phthalate | 7 |
| Wax | 1 |

Cans lined with this lacquer are baked in dry, circulating hot air at about 250° F. for about 30 minutes, and the coating is strongly adherent to the metal, tough, flexible, free of odor and taste, and resistant to acids, alkalies, water and moisture vapor. The lining is excellent for such a difficultly packageable product as beer. The film strength and stability persisted at high temperatures, e. g., pasteurizing and sterilizing temperatures, and the film neither presented objectionable thermoplasticity at normal room temperatures, nor exhibited tackiness in storage. The plasticizer, such as diamylphthalate is included to lower the softening point and to increase flexibility, but may be omitted in some cases. Also, the film is rendered sufficiently plastic under pressure so that in forming a can seam as by rolling the flanges, the film provides an excellent seam seal.

This coating may be applied to paper which has been previously varnished, or directly to metal foil, e. g., aluminum foil for cap spotting or other facing purposes. In this connection, instead of using Formvar resin, Butvar resin may be employed with a suitable solvent such as an alcohol to produce a coating satisfactory for certain lining purposes in connection with cans and closures, although this resin is not as desirable as Formvar where taste is easily affected. Such coating is also satisfactory for producing paper spotting or facing materials by applying the same upon a previous coat of lacquer or varnish, or directly to the surface of a metal foil.

I have also discovered that a container lined with the above composition will adhere a silver coating, e. g., one produced by vaporizing silver in a vacuum and causing it to deposit on the coated wall of the can. Such a silver film is thin, having a thickness of about five millionths of an inch and is continuous.

As an example of a composition including chlorinated rubber and polyvinyl acetal resin to impart greater film strength to the chlorinated rubber film, a spray coating is prepared as follows and applied directly to black iron or aluminum coated black iron:

*Example 2*

| | | |
|---|---|---|
| Chlorinated rubber (low viscosity; 10 centipoises) | ounces | 8.0 |
| Formvar resin 15/95 | do | 1.0 |
| Diamyl phthalate | do | 2.0 |
| Wax | grams | 6.0 |
| Trichloroethylene | ounces | 12.0 |
| Ethylene dichloride | do | 15.0 |

This coating is dried at about 240° F. in hot dry circulating air for about thirty minutes. Cans lined with this coating were packed with beer and subjected to accelerated aging. No off taste could be detected in the beer after an accelerated aging period which was quite severe and which amounted to substantially three months. Since beer is extremely sensitive to resins, this test further proved that the polyvinyl acetal type of resin is useful as a lining material for food and beverage containers.

*Example 3*

To Example 1 there may be added an appropriate amount of low viscosity (10 centipoises) chlorinated rubber to increase film thickness of the deposited film. For example, as much as 30 grams of this chlorinated rubber or more may be added as required, and I have discovered that the viscosity of the solution is not objectionably raised while a thicker film is obtainable than with solutions mainly or alone of polyvinyl acetal resin having substantially the same viscosity.

The inclusion of the chlorinated rubber may be in such amount as to render the sprayable solution useful for purposes of roll coating.

The coating is dried as recited in connection with Example 1 at about 240° F.

The following composition is useful as a protective coating for caps, i. e., is sprayed upon the interior of a cap before or after a cushion liner has been assembled therein so as to form a continuous strong film covering. For example, a cork composition liner and the adjacent interior exposed area of the skirt, including the raw edge thereof, may be coated as described in application Serial No. 347,538.

*Example 4*

|  | Ounces |
|---|---|
| Formvar resin 15/95 | 15 |
| Ethylene dichloride | 200 |
| Diamyl phthalate | 3 |

This composition coats the hills and valleys of the skirt of a crown cap, being applied to the usual lacquered surface thereof, so that it completely covers not only the cork composition, but the interior exposed wall of the skirt, as well as the raw edge thereof with a continuous film. Instead of spraying to accomplish this operation, assembled crowns are held by a magnet and dipped into the coating, so that the cushion liner and skirt are covered. After drying, a continuous film covered the liner and crown skirt on the interior thereof, including the raw edge, and under test gave no off taste to beer or distilled water. Preferably, this coating is applied by spraying, and while I have indicated that it is desirable as an interior film to cover the cork composition liner and the adjacent interior of the skirt, including the raw edge, the entire exterior of the crown cap or other closure, as well as the entire interior surface thereof may be similarly coated. The coating is preferably dried at room temperature in about thirty minutes by means of an air current created from a fan.

This coating is also useful for spot and overall facings of paper or foil.

As heretofore explained, polyvinyl acetal resins are compatible with certain long oil alkyd resins and may be used with these resins to increase the alkali-resistance thereof. Coatings of this type are suitable for varnishing the outside of containers and closures, but may be used in many cases for interior lining purposes. Such compositions may contain aluminum powder and give a bright leafed aluminum finish, or any other suitable pigment may be added such as "Titanox." In this connection also, a clear solution may be made and applied over a suitable base coating which may be of the varnish or lacquer type or of a metal, such as aluminum, and give a very attracive appearance.

The following is an example of a coating of this character:

*Example 5*

|  | Parts |
|---|---|
| Long oil alkyd resin (807 Resyl) | 100 |
| Polyvinyl acetal resin (Butvar) | 25 |
| Wax (ceresin) | 1 |
| Chloroform | 400 |
| Butanol | 350 |

The above composition is dried at about 280° F. in substantially thirty minutes in dry circulating air, and forms a smooth continuous coating.

In addition to its utility as a coating material for metal containers and closures, the composition of Example 5 can be applied to paper and thereafter a coating, such as set forth in Example 1, or a coating as set forth in Example 3 may be applied thereover. The coating of the paper takes place on one side thereof, and on the other side a suitable thermoplastic or spotting adhesive coating is formed, so that the paper, when dried and coiled, may be used with the usual high speed automatic spotting machinery for applying center spots to caps, as well as other facings, such as overall liners thereto.

In connection with Example 5, a composition in which the amount of polyvinyl acetal resin exceeds the amount of alkyd resin may be utilized in some cases as where it is desired to have a strong film which is plasticized somewhat by the presence of the alkyd resin.

It is to be understood that the coating compositions exemplified herein may be applied directly to the black iron of the metal can, or may be applied to suitable base coatings thereon, either interiorly or exteriorly of the container. This applies with equal effect to metal closures, as well as can bottoms and tops. As pointed out, the compositions are not only firmly adherent to metal and form strong, tough films, but are likewise adherent to non-metallic materials, of which paper and cork composition and varnishes and lacquers are suitable examples.

While I have indicated a preference for spray coating, it is to be understood that roll coating may be resorted to, and I have explained how certain of the sprayable solutions may be rendered suitable for this purpose.

In connection with the polyvinyl acetal resin employed, this is a completely or partially reacted product and prepared substantially in accordance with the patent to Morrison, No. 2,036,092, granted March 31, 1936. In addition to Formvar 15/95, I have also used Formvar 4/90 and Formvar 7/95.

Also, I have referred to the use of chemical plasticizers in making up the several examples, but, in some cases, I use a drying oil plasticizer, such as tung oil.

The compositions described have all been found satisfactory for the interior and exterior coating of containers, container bottoms and tops, as well as closures, and for coating foils and paper to provide spotting and other facing materials. It is to be understood, of course, that the proportions given in the several examples are purely by way of illustration and may be modified without departing from the invention.

In connection with the coating of closures, as well as bottoms and tops, these are frequently initially provided with a surface coating of lacquer on both the interior and exterior thereof, and while the compositions herein described may be applied directly to such articles without the use of such lacquers, my compositions are particularly useful when deposited as films upon the lacquers or upon the coating, such as tin plate.

The film thickness of the coatings deposited from the several compositions varies with the use of the film, but the films are generally of a thickness of between substantially five-ten thousandths of an inch and one-one thousandth of an inch. Thicker or thinner coatings may be used.

In coating the interior of a container to provide a liner the film is coextensive and continuous with the entire interior wall surface of the container body. This is likewise true with respect to the entire inner exposed surface of the container, bottom, and top where the same is used. In the case of closures, I have already explained that the closure may have its entire inner surface coated with a continuous film or the cushion liner and exposed inner surface of the skirt and raw edge may be coated with a continuous film. The coatings where they are applied exteriorly, are likewise continuous and coextensive with the container bodies, bottoms and tops, and closures.

The sealing characterisic of the compositions is an important feature of the invention, and, as pointed out, the composition may be coated upon either the body seaming flange or the bottom seaming flange or both. In this connection, in the case of cans of the side seam type, the seaming flanges, either one or both of them, may be coated with the composition and likewise the bottom and top may be sealed by coating either the body flange or the bottom and top seaming flanges or both. Also, where the can bodies are lined with the compositions herein described, the flange coatings are co-extensive and continuous with the wall coating, and this is likewise true in the case of side seam flanges and the seaming flanges of bottoms and tops.

With respect to the base coating which may be utilized, I employ a coating such as described in Serial No. 322,238, in the form of an aluminum varnish, or aluminum may be included in the composition of Example 5 to provide a suitable base coating. Other base coatings may be lacquers and varnishes and enamels which are now commercially available. Also, the base coating may be of pure metallic type, such as aluminum, tin, or alloys.

In connection with the use of a base coating, the compositions described in the above examples are suitable for this purpose, in that they may be applied to paper, metal, etc., in as many coats as necessary so as to build up a required base coat, and then the same composition or another composition as described in the examples may be applied upon such base coat. This procedure is not preferred, but has been employed with success.

It will be noted that Example 1 provides a coating or lining for metal cans comprising polyvinyl acetal resin and wax, while Examples 2 and 3 provide films of chlorinated rubber, polyvinyl acetal resin and wax, Example 4 provides polyvinyl acetal resin only, and Example 5 provides a film of a mixture of resins, including polyvinyl acetal resin and wax. In connection with Example 5, a part of the polyvinyl acetal resin may be replaced by chlorinated rubber, if desired, in order to improve the alkali resistance of coating. In such a case, the total resin will be at least 50%, and, as heretofore explained, the polyvinyl acetal resin alone is satisfactory for the purpose, but there are cases where the inclusion of chlorinated rubber may be desirable.

As heretofore explained, the linings or coatings produced by the present invention are stable and have a long life. Such linings are free of peeling or cracking, and do not soften or melt above the pasteurization temperature of substantially 150° F. In fact, the linings or coatings are stable at sterilizing temperatures of 180° F. or higher.

It will be noted in the case of Examples 1 and 2 that the wax employed is less than 50% and that in the case of Example 3, as well as Example 5, the resin is present in an amount of at least 50%.

It has been found that the presence of the rubber in certain of the compositions renders the wax and resin more compatible and enhances their miscibility particularly when resins such as polyvinyl acetal resins and alkyd resins are used.

While compositions containing polyvinyl resins are preferred, for treatment of the containers and container parts, as described herein, other resin bases may be used such as urea aldehyde resin, cumar resin and arochlor resin, and mixtures thereof including the acetal resin. Also wax may comprise the base with or without resin and among the waxes which may be employed are paraffin, ozokerite, petroleum wax, hydrogenated vegetable oil wax, montan wax, halo-wax, candelilla, mineral beeswax, ceresin, carnauba and mixtures thereof. In the resin, wax or resin-wax base, there is in some cases included rubber and in addition to chlorinated rubber, the rubber may be provided by latex, a latex solution, with or without casein, a latex-wax as described in the patent to Weiss, No. 1,563,410, December 1, 1935, latex as described in the patent to Schloz, No. 1,729,522, September 24, 1929, and such rubber products as "Vultex," "Revertex" and other preparations containing rubber.

In some cases, the wax is present in the base as a mixture of a characteristically hard high melting point wax in quantity of less than 20% of the whole, such high melting point waxes being hydrogenated vegetable oil wax, montan wax, halo-wax, candelilla wax, and mineral beeswax or ceresin waxes containing carnauba wax. Thus mineral beeswax or ceresin wax containing carnauba or other high melting point wax can be mixed with latex and petroleum wax paraffin or a plastic wax to raise the exudation and dry melting points for extreme conditions of temperature and pressure.

The amount of rubber to be included will vary depending upon the film forming characteristics of the resin and its miscibility with the wax. With polyvinyl acetal resin which readily forms films, as little as .5% of rubber can be included and the rubber may increase as high as from 5 to 10%, depending upon the nature of the film desired. With none of the resins mentioned has it been found desirable to use greater than 30% rubber.

A suitable resin-wax product for lining and coating containers and parts thereof will comprise a polyvinyl acetal resin base in amount of at least substantially 50% and wax in amount not greater than 50%. As explained above, to such a composition rubber may be included if desired, and in amount of at least .5% and less than 30% or the amount of rubber may be varied to the end that all of the compositions prepared in accordance with this invention are free of peeling and cracking and have a melting point above the pasteurization temperature of substantially 150° F.

When wax alone is added to a solution of a polyvinyl acetal resin and a film is cast from this solution and dried, the greater part of the wax normally comes to the surface which is desirable in some cases, since the resin and wax are incompatible. By preparing a rubber-wax compound, for example, 90 parts paraffin wax containing about 6% of rubber, and adding this material to a polyvinyl acetal resin solution, a film prepared from the resulting solution retains much more of the wax. In other words, the rubber evidently retards the separation of wax from the resin. Such a film, naturally, possesses greater water resistance and, at the same time, its strength and flexibility are not weakened because of the effect of the rubber.

Using 95 parts of the same latex-wax material (paraffin wax containing rubber) while practically impossible to add 5 parts of polyvinyl acetal resin through the means of heat and agitation, a mutual solvent, such as chloroform or dioxan, effects a homogeneous mixture. Sufficient solvent should be used so that concentration of polyvinyl acetal resin is not greater than 10%.

When the latex and wax are mixed, as in the Weiss patent, the water is evaporated but the latex salts remain. By milling crepe rubber until it is very soft, wax can be added up to as high as 50%. This product is readily soluble in pure wax and, accordingly, a wax containing any desired percentage of rubber can be easily and quickly prepared. Such a rubber-wax product does not contain any of the latex salts and is readily soluble in many of the polyvinyl acetal resin solvents. This is a preferred way of preparing rubber-wax mixtures.

Urea resins are normally hard and brittle after being insolubilized and the addition of latex-wax is highly desirable in order to increase the strength and flexibility. Polyvinyl acetal resins are very strong and flexible but the addition of the rubber-wax compound greatly improves moisture resistance. It is preferred to employ a mutual solvent in order to bring about the best results.

In the accompanying drawing I have shown for purposes of illustration containers, closures, and facing materials in accordance with this invention. It is to be understood that the invention is applicable to containers generally, as well as to caps of various kinds, and is useful with a wide variety of spotting or facing materials.

Referring to the drawing:

Figure 1 is a perspective view of a seamless container body.

Figure 2 is a fragmentary sectional view of the same taken through the body wall and the seaming flange at the bottom thereof.

Figure 3 is a fragmentary sectional view showing the manner in which containers formed in accordance with this invention are sealed by coating materials applied to their respective seaming flanges of the bottom and body.

Figure 4 is a sectional view of a cap having a continuous internal coating on the cushion liner, exposed interior wall of the skirt and the raw edge thereof.

Figure 5 is a sectional view, fragmentary in nature, of strip facing material prepared in accordance with this invention.

Figure 6 is an inside plan view of a closure having a center spot of the material of Figure 5.

Figure 7 is a sectional view of a closure having an overall facing of the material shown in Figure 5, and Figure 8 is a fragmentary sectional view showing a side seam sealed in accordance with this invention by means of the coating formed on the seaming flanges of the body.

Referring to Figure 1, I have shown a container body 10 of metal which is drawn from a single blank and includes a top, neck and cap receiving finish at one end, while at the other end the seamless body is provided with a laterally extending seaming flange 11. This seamless container body is formed in accordance with application Serial No. 334,876.

In Figure 2, I have shown the interior of the body wall 10 provided with a base coating 12 and a surface coating 13 being one of the compositions above set forth. It will be noted that the surface coating 13 is continuous and coats the surface of the sealing flange 11.

In Figure 3, I have shown a container, such as illustrated in Figure 1, sealed with a bottom indicated as a whole at 14. This bottom is coated on its interior surface in the same manner as described in connection with Figure 2, namely, with a base coat 12, and a surface coat 13. It will be noted that the seaming flange 11 of the body and the seaming flange 15 of the bottom are provided with films continuous with the film 13, and when the body and bottom are united together into a seam as shown in Figure 3, these coatings provide a very satisfactory seal.

Referring to Figure 8, I have illustrated a container having a side seam 16, the wall 10 of the container body being provided with a base coating 12 and a surface coating 13 in accordance with this invention. The seaming flanges 17 are similarly coated and the coating is continuous with the coating on the wall of the body 10. In this manner, when the flanges 17 are seamed together, the resultant side seam is suitably sealed by the coating. In this connection, the side seam can will have its bottom seamed thereto in the manner shown in Figure 3 and sealed in the same way, and this will likewise be true in the case of the top for the container, the top and bottom being usually referred to as "ends."

Referring to Figure 4, there is illustrated a crown cap having a skirt 20, a cushion liner 21, and a film 22 in accordance with the present invention continuously coating the cushion liner, the adjacent exposed inner wall of the skirt, and the free edge thereof.

In Figure 5, I have shown a spotting material of paper in which 25 indicates the paper backing layer, 26 the adhesive layer, 27 the base coat, and 28 a surface coating in accordance with the present invention.

In Figure 6, I have shown a crown cap having a center spot 29 of the facing material shown in Figure 5, the spot 29 being adhesively united by the adhesive film 26 to a cushion liner of composition cork similar to that shown at 21 in Figure 4.

In Figure 7, I have shown a cap provided with an overall facing indicated as a whole at 30 of the facing material illustrated in Figure 5.

As heretofore explained, the film composed entirely, mainly or including polyvinyl acetal resin and other materials provides an excellent seam seal, since it is flexible and under pressure, for instance, incident to the seaming operation illustrated in Figures 3 and 8, softens sufficiently to exert the required plastic sealing quality. The sealing material may be upon one seaming flange or the other, or both thereof in the constructions shown in Figures 3 and 8. Preferably, the coating on a seaming flange is continuous with the lining coating on the container body, bottom or top.

Referring further to Figure 3, I have shown an external coating for the body which includes a suitable base layer 31 and a surface coating in accordance with this invention indicated at 32. A similar exterior coating may be applied to the body 10 of the side seam container shown in Figure 8, so that the containers, whether seamless or fabricated, will have both internal and external coatings prepared in accordance with the aforesaid examples.

Also, in connection with Figure 3, I have shown the bottom 14 provided with an external coating 33 of tin plate, but such coating may be similar to the internal coatings, in that it comprises a base coating and a surface coating as described.

Referring to Figure 5, the backing layer 25 instead of being of paper may be of other cellulosic materials or synthetic materials or metal foil, such as aluminum, and is usually supplied as a continuous strip for use in high speed spot applying or facing applying machinery.

While I have illustrated the coatings as including a base coating and a surface coating, it is to be understood that the coatings described herein above may be applied directly to the metal surface, e. g., of black iron, without the necessity for an intermediate base coating.

Referring to Figures 4, 6 and 7 the caps therein illustrated are crown caps, but the invention is equally useful in connection with screw caps, lug caps, pressed on caps, and, in fact, closures of all characters, as well as can ends of various types. In this connection, the closure or can ends may have directly applied to the internal and external surfaces thereof coatings in accordance with this invention, namely, a polyvinyl acetal resin coating applied directly to the metal or to an intermediate base coat. In the case of caps which include a cushion liner, this coating may be applied before the cushion liner is assembled in the cap.

In the various examples mentioned above, I have indicated the use of wax, a plasticizer, or both. It is to be understood that for some purposes the wax and plasticizer may be omitted, or either one or the other employed. In connection with Example 5, a suitable chemical or drying oil plasticizer may be used in about the proportions indicated in the other examples. In referring to a container "part," I intend to cover not only a container body, but a container closure and other container parts referred to herein such as closure facings, can ends, seams, etc.

This application is a continuation-in-part of my applications, Serial No. 78,047, filed May 5, 1936, and Serial No. 350,810, filed August 3, 1940.

I claim:

1. A metal container for foods and beverages or part thereof having a coating comprising a base selected from a group consisting of waxes and resins and mixtures thereof, and rubber, the rubber being present in an amount of at least .5% and less than 30% and said coating being free of peeling and cracking and having a melting point above the pasteurization temperature of substantially 150° F.

2. A metal container or part thereof in accordance with claim 1 in which the wax is one selected from a group consisting of paraffin, ozokerite, petroleum wax, hydrogenated vegetable oil wax, montan wax, halo-wax, candelilla, mineral beeswax, ceresin, carnauba and mixtures thereof.

3. A metal container or part thereof in accordance with claim 1 in which the wax includes a proportion of high melting point wax in amount of less than 20%.

4. A metal container or part thereof for foods and beverages and parts thereof having a coating comprising a resin base in amount of at least substantially 50% and wax in amount not greater than 50%, said coating being free of peeling and cracking and having a melting point above the pasteurization temperature of substantially 150° F.

5. A metal container or part thereof in accordance with claim 4 in which the base is selected from a group consisting of urea aldehyde resin, cumar resin and arochlor resin.

6. A metal container or part thereof in accordance with claim 1 in which the resin is polyvinyl acetal resin and the wax is present in greater amount than the resin.

7. A metal container or part thereof in accordance with claim 1 in which the resin is polyvinyl acetal resin and is present in amount not greater than 10%, the major portion of the remainder of the coating being wax.

8. A metal container for foods and beverages or part thereof having a coating comprising a resin base of the polyvinyl acetal type, rubber and wax in amount not greater than 50%, said coating being free of peeling and cracking and having a melting point above the pasteurization temperature of substantially 150° F.

9. A metal container for foods and beverages or part thereof having a coating comprising a resin base of the polyvinyl acetal type, chlorinated rubber and wax in amount not greater than 50%, said coating being free of peeling and cracking and having a melting point above the pasteurization temperature of substantially 150° F.

10. A metal container for foods and beverages or part thereof having a coating comprising a resin base in amount of at least 50%, said resin base comprising polyvinyl acetal resin, and rubber, said coating being free of peeling and cracking and having a melting point above pasteurization temperature.

11. A metal container for foods and beverages or part thereof having a coating comprising a resin base of the polyvinyl acetal type and wax in amount not greater than 50%, said coating being free of peeling and cracking and having a melting point above the pasteurization temperature of substantially 150° F.

12. A metal container for foods and beverages or part thereof having a coating comprising a resin base of the polyvinyl acetal type, an alkyd resin, and wax in amount not greater than 50%, said coating being free of peeling and cracking and having a melting point above the pasteurization temperature of substantially 150° F.

13. A metal container for foods and beverages or part thereof having a coating comprising a resin base in amount of at least 50%, said resin base comprising polyvinyl acetal resin and an alkyd resin, and rubber, said coating being free of peeling and cracking and having a melting point above pasteurization temperature.

CHARLES E. McMANUS.